(12) United States Patent
Kraus et al.

(10) Patent No.: US 10,830,238 B2
(45) Date of Patent: Nov. 10, 2020

(54) AIR-OIL RESERVOIR FOR AN AIR COMPRESSOR

(71) Applicant: SCHULZ COMPRESSORES S.A., Joinville SC (BR)

(72) Inventors: Gilberto Kraus, Joinville-Santa Catarina (BR); Nelson Santi Junior, Joinville-Santa Catarina (BR)

(73) Assignee: SCHULZ COMPRESSORES LTDA., Joinville SC (BR)

( * ) Notice: Subject to any disclaimer, the term of this patent is extended or adjusted under 35 U.S.C. 154(b) by 205 days.

(21) Appl. No.: 15/540,867

(22) PCT Filed: Dec. 28, 2015

(86) PCT No.: PCT/BR2015/050273
§ 371 (c)(1),
(2) Date: Jun. 29, 2017

(87) PCT Pub. No.: WO2016/106446
PCT Pub. Date: Jul. 7, 2016

(65) Prior Publication Data
US 2017/0356447 A1 Dec. 14, 2017

(30) Foreign Application Priority Data
Dec. 30, 2014 (BR) .......................... 1020140329609

(51) Int. Cl.
*B01D 50/00* (2006.01)
*F04C 29/02* (2006.01)
(Continued)

(52) U.S. Cl.
CPC ............ *F04C 29/026* (2013.01); *B01D 45/02* (2013.01); *B01D 45/06* (2013.01); *B01D 45/08* (2013.01);
(Continued)

(58) Field of Classification Search
CPC ... F04C 29/026; B01D 2267/40; B01D 45/06; B01D 46/0023; B01D 46/0031; B01D 45/02; B01D 45/08
See application file for complete search history.

(56) References Cited

U.S. PATENT DOCUMENTS 3,917,474 A * 11/1975 Heckenkamp ......... B01D 45/06
55/330
6,736,884 B2 * 5/2004 Virgilio .................. B01D 45/08
55/426
(Continued)

FOREIGN PATENT DOCUMENTS

EP 1004774 A2 5/2000
WO 2014041407 A2 3/2014

*Primary Examiner* — Dung H Bui
(74) *Attorney, Agent, or Firm* — Dinsmore & Shohl LLP (57) ABSTRACT

The compressor is inferiorly provided with a discharge nozzle and with shoes which are seated and affixed against a support plate, incorporated to the air-oil reservoir and provided with an admission hole aligned with the discharge nozzle, and with a tubular column, incorporated to the air-oil reservoir and open to the interior of the latter. The air-oil reservoir further presents: an inner housing receiving a thermostatic valve, connected to the interior of the air-oil reservoir and also to the compressor and to an oil radiator, as a separate device, through cold oil outlet and hot oil outlet nozzles of the air-oil reservoir; openings for the direct coupling of an oil filter and of an air-oil separating filter; and an end housing lodging a minimum pressure valve.

16 Claims, 7 Drawing Sheets

(51) Int. Cl.
    *B01D 45/02*     (2006.01)
    *B01D 45/06*     (2006.01)
    *B01D 45/08*     (2006.01)
    *B01D 46/00*     (2006.01)

(52) U.S. Cl.
    CPC ...... *B01D 46/0023* (2013.01); *B01D 46/0031* (2013.01); *B01D 2267/40* (2013.01)

(56) References Cited

U.S. PATENT DOCUMENTS

| | | | |
|---|---|---|---|
| 7,115,149 B2 * | 10/2006 | Stickland | F04C 29/026 55/319 |
| 2003/0014951 A1 | 1/2003 | Crouse | |
| 2004/0173193 A1 * | 9/2004 | Burgess | B01D 46/0031 123/573 |
| 2005/0217221 A1 | 10/2005 | Stickland et al. | |

* cited by examiner

AIR-OIL RESERVOIR FOR AN AIR COMPRESSOR

CROSS-REFERENCE TO RELATED APPLICATIONS

This application is the U.S. National Phase of PCT/BR2015/050273 filed Dec. 28, 2015, which claims priority of Brazil Patent Application 1020140329609 filed Dec. 30, 2014.

FIELD OF THE INVENTION

The present invention refers to an air-oil reservoir of the type constructed in a single piece of cast iron (or aluminum or steel) and to be used in a mounting arrangement with an air compressor, usually of the rotary screw type and, for example, with a power from 5 to 20 HP, in order to define a compact assembly for producing compressed air, using a reduced number of external tubular connections.

PRIOR ART

There are well known in the prior art the rotary screw air compressors, of the type usually affixed, jointly with the respective motor, in the same support frame, the compressor being operatively connected, by means of external tubes, to an air-oil reservoir.

In said known technical solutions, the support frame and the air-oil reservoir are usually affixed onto a base plate, with the reservoir being somewhat spaced from the compressor, requiring the provision of different tube extensions with the respective connections, in order to operationally connect the discharge of the compressor to the reservoir, and to connect the latter to the several devices for the control and treatment of the compressed air-oil mixture, before a compressed and oil-free air flow is released from the reservoir to the points of consumption.

Although allowing different models of compressor to be affixed on the same base plate of the reservoir, this type of mounting arrangement requires, for each compressor model, the provision of a specific support frame, usually constructed in metallic plate portions, which need to be shaped or welded, with undesirable consumption of material and manpower. Moreover, this type of air compressor further requires the provision of said tube extensions for connecting the different devices involved in the mounting operation.

Aiming at eliminating the drawbacks mentioned above, some constructive solutions were proposed, in which the compressor is seated and affixed directly onto an air-oil reservoir, with the latter and the motor of the compressor being seated and affixed onto a single base plate.

In this other known type of construction, the air-oil reservoir is superiorly shaped, in a single piece, in order to allow for the seating and fixation of a specific compressor model, said reservoir being further provided with the usual nozzles in which are coupled, either by means respective tube extensions, or by the connection of peripherals, the known devices for the treatment of the compressed air-oil flow and for the operational control of the assembly, such as air-oil separating filter, oil filter, minimum pressure valve, thermostatic valve, temperature sensor, relief valve, filling plug, reservoir drain, oil radiator and oil level sight glass.

Although it simplifies and compacts the structural elements of the mounting arrangement of both the air-oil reservoir and the compressor, eliminating the structural frame for the motor-compressor assembly and the tubular connection, in a separate piece, between the outlet of the compressor and the air-oil reservoir, this prior art construction still presents the drawback of having the air-oil reservoir superiorly shaped as a function of each compressor model to be affixed thereon, requiring the manufacture of different models of reservoir made of cast iron, each model designed to receive a specific compressor model. Such characteristic increases the manufacture cost of the motor-compressor-reservoir assembly.

Besides the drawback mentioned above, the air-oil reservoir of said solution is constructed so as to also receive the tube extensions and/or the peripheral fittings for mounting the devices and for treating the air-oil flow compressed by the compressor and to be supplied to the points of consumption. This type of construction requires the provision of a plurality of tubular connections and/or peripheral fittings which increase the cost and weaken the mounting arrangement.

OBJECTIVE OF THE INVENTION

Due to the drawbacks mentioned above and related to the known constructive solutions, it is the object of the present invention to provide an air-oil reservoir, formed in a single piece of cast iron (or aluminum and steel) and which allows an air compressor, for example a rotary screw air compressor to be directly affixed and operatively coupled thereon, without requiring the provision of tubular connections and/or peripheral fittings, external to the air-oil reservoir, for coupling said devices for the treatment of the compressed air-oil flow to be released to the points of consumption.

SUMMARY OF THE INVENTION

In order to achieve the generic objective cited above, the present invention proposes an air-oil reservoir of the type constructed in a single piece, usually of cast iron and to be used in a mounting arrangement with an air compressor of the type inferiorly provided with an air-oil flow discharge nozzle and with support and anchoring shoes.

According to the invention, the air-oil reservoir incorporates, in a single piece, a superior and external support plate, presenting an upper face, an admission through hole, and also a plurality of fixation holes, the discharge nozzle and the shoes, of the model of the air compressor used in the mounting arrangement, being seated and affixed against the upper face of the support plate, with the discharge nozzle being aligned with the admission through hole and with the shoes being aligned with respective fixation holes, the air-oil reservoir further incorporating, in a single piece, a tubular column having an inlet end joined to the admission hole, and an outlet end open to the interior of the air-oil reservoir.

The construction defined above allows different models of compressor to be easily seated and affixed onto the support plate of the air-oil reservoir, it only being necessary to make fixation holes in the support plate, of standard construction, in order to obtain, usually by means of screws, the correct fixation of the compressor shoes onto the air-oil reservoir.

Moreover, the air-oil reservoir may have its different nozzles constructed in order to allow the direct coupling of the different devices for the treatment and operational control of the assembly, as better explained in details hereinafter.

BRIEF DESCRIPTION OF THE DRAWINGS

The invention will be described below, with reference to the appended drawings, given by way of example of a possible embodiment for the present air-oil reservoir, and in which.

DESCRIPTION OF THE INVENTION

Figure 8:
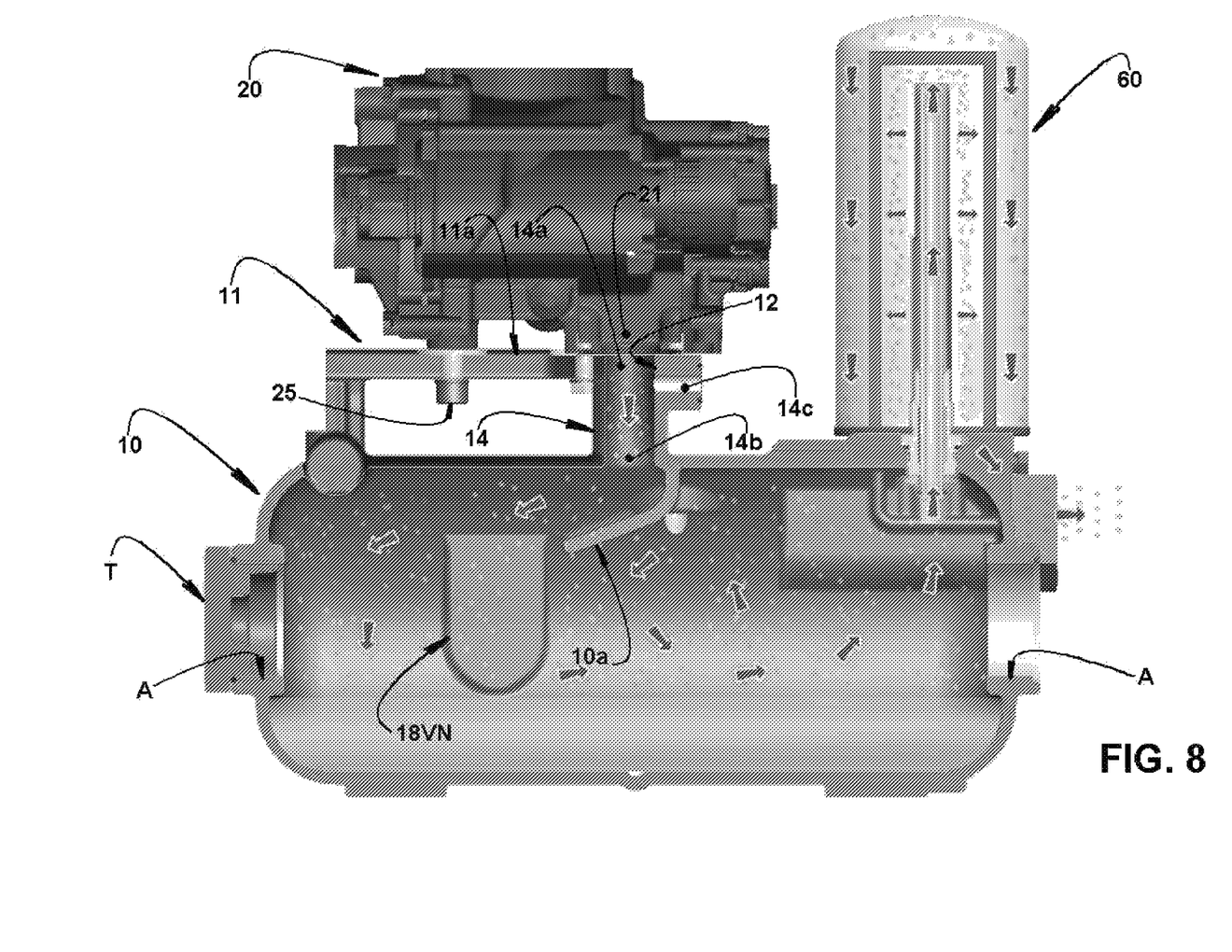
FIG. 8 represents a longitudinal cross-sectional view of the air-oil reservoir affixing the compressor in its mounted position.

As already discussed and illustrated in the appended drawings, the present air-oil reservoir 10 is of the type constructed in a single piece, usually in cast iron and to be used in a mounting arrangement with an air compressor 20, usually of the rotary screw type, which is inferiorly provided with an air-oil flow discharge nozzle 21 and with support and anchoring shoes 22, the latter being usually provided with threaded holes (not illustrated), designed for receiving respective fixation screws 25 (see FIG. 8).

The air-oil compressor 20 is usually driven by a motor M, usually electric, by means of an adequate transmission, which may be defined by an assembly of pulleys P and belts C. The air compressor 20 may present different models with a power of about, for example, 15 HP, but which may vary from about 5 HP to 20 HP, and different drilling patterns in its shoes 22, said air compressor 20 being further provided with the usual devices for admission and filtration AF of the atmospheric air, and seated and affixed onto the air-oil reservoir 10, as better described hereinafter. The air-oil reservoir 10 and the motor M are usually mounted and affixed onto the same base plate PB.

Figure 1A:
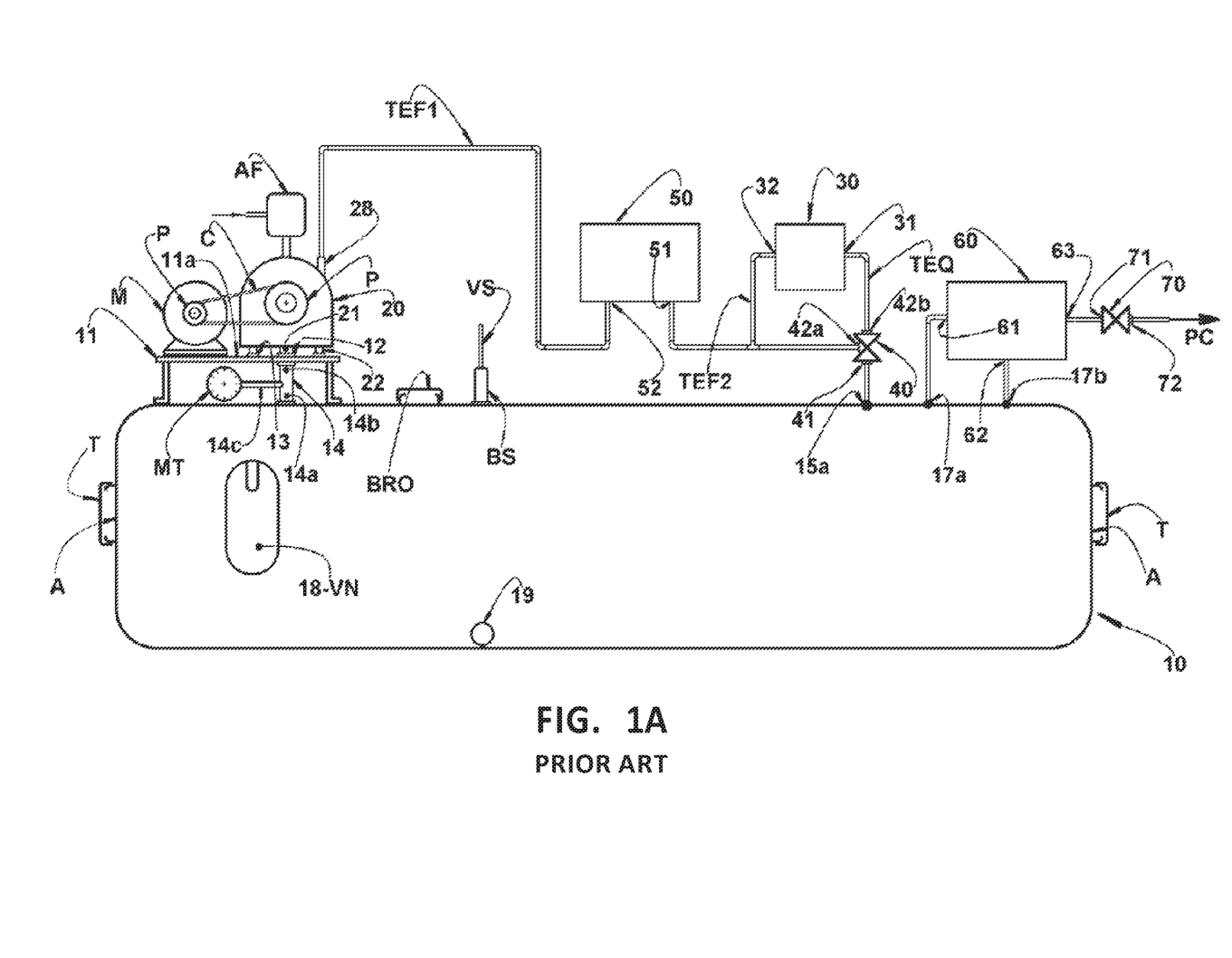
FIG. 1A represents a schematic flowchart of the elements of a typical mounting arrangement of a motor-air compressor assembly with an air-oil reservoir, in which the devices for the treatment and operational control of the air-oil flow are connected to the reservoir by means of external tube extensions, according to the state of the art.

FIG. 1A of the appended drawings represents a typical assembly of the state of the art, in which the devices for the treatment and operational control of the air-oil flow are connected to the reservoir by means of external tube extensions deprived of numeral references, with only the devices for the treatment and operational control being characterized by the same references used hereinafter in relation to the corresponding devices of the construction object of the present invention.

According to the invention, as illustrated in FIGS. 1A to 8, the air-oil reservoir 10 incorporates, preferably in a single piece, a superior and external support plate 11, having an upper face 11a and an admission through hole 12, and also a plurality of fixation holes 13 through which are passed the fixation screws 25 to be affixed in the interior of the respective threaded holes (not illustrated) of the shoes 22 of the air compressor 20.

With this construction, the discharge nozzle 21 and the shoes 22, of the model of the air compressor 20 used in the mounting arrangement, are seated and affixed against the upper face 11a of the support plate 11, with the discharge nozzle 21 of the air compressor 20 being aligned with the admission hole 12 and the shoes 22 aligned with respective fixation holes 13 of the support plate 11. Thus, the support plate 11 may have its fixation holes 13 made according to the pattern of the shoes 22 of the model of air compressor 20 to be affixed onto the air-oil reservoir 10, in order to receive the fixation screws 25. In other words, the same support plate 11, that is, the same pattern of air-oil reservoir 10 may have affixed, onto itself, different models of air compressor 20, it being only necessary to make the fixation holes 13 according to each pattern of air compressor 20.

Still according to the construction proposed for the air-oil reservoir 10, the latter incorporates, preferably in a single piece, a tubular column 14 having an inlet end 14a joined to the admission hole 12 and an outlet end 14b open to the interior of the air-oil reservoir 10, allowing the air-oil flow, pressurized by the air compressor 20, to be directly conducted to the interior of the air-oil reservoir 10, the latter being further provided with an inner deflector 10a located in front of the outlet end 14b of the tubular column 14.

Besides the constructive aspect regarding the great flexibility in mounting different models of air compressor 20 in the same constructive pattern of air-oil reservoir 10, the latter still presents a constructive characteristic related to the fact of being operatively coupled to an oil radiator 30 provided with an oil inlet 31 and an oil outlet 32.

According to the invention, the air-oil reservoir comprises an inner housing 10b, accessible from the exterior of the latter, having an end open to the interior of the reservoir through an oil outlet 15a, in the interior of said inner housing 10b being mounted a thermostatic valve 40 having an inlet 41 open to the interior of the air-oil reservoir 10 through the oil outlet 15a.

The thermostatic valve 40 has a first outlet 42a open to a first internal channel C1, formed in the body of the air-oil reservoir 10 and which leads to an outlet opening 16a of the latter, the thermostatic valve 40 being further provided with a second outlet 42b open to a second internal channel C2, formed in the body of the air-oil reservoir 10 and which leads to a hot oil outlet 15c of the latter. The air-oil reservoir 10 is further provided with an inlet opening 16b, adjacent to the outlet opening 16a and which is connected, through a third internal channel C3, formed in the body of the air-oil reservoir 10, to a cold oil outlet 15b of the latter. The function of the outlet opening 16a and of the inlet opening 16b of the air-oil reservoir 10 will be described below.

Figure 1B:
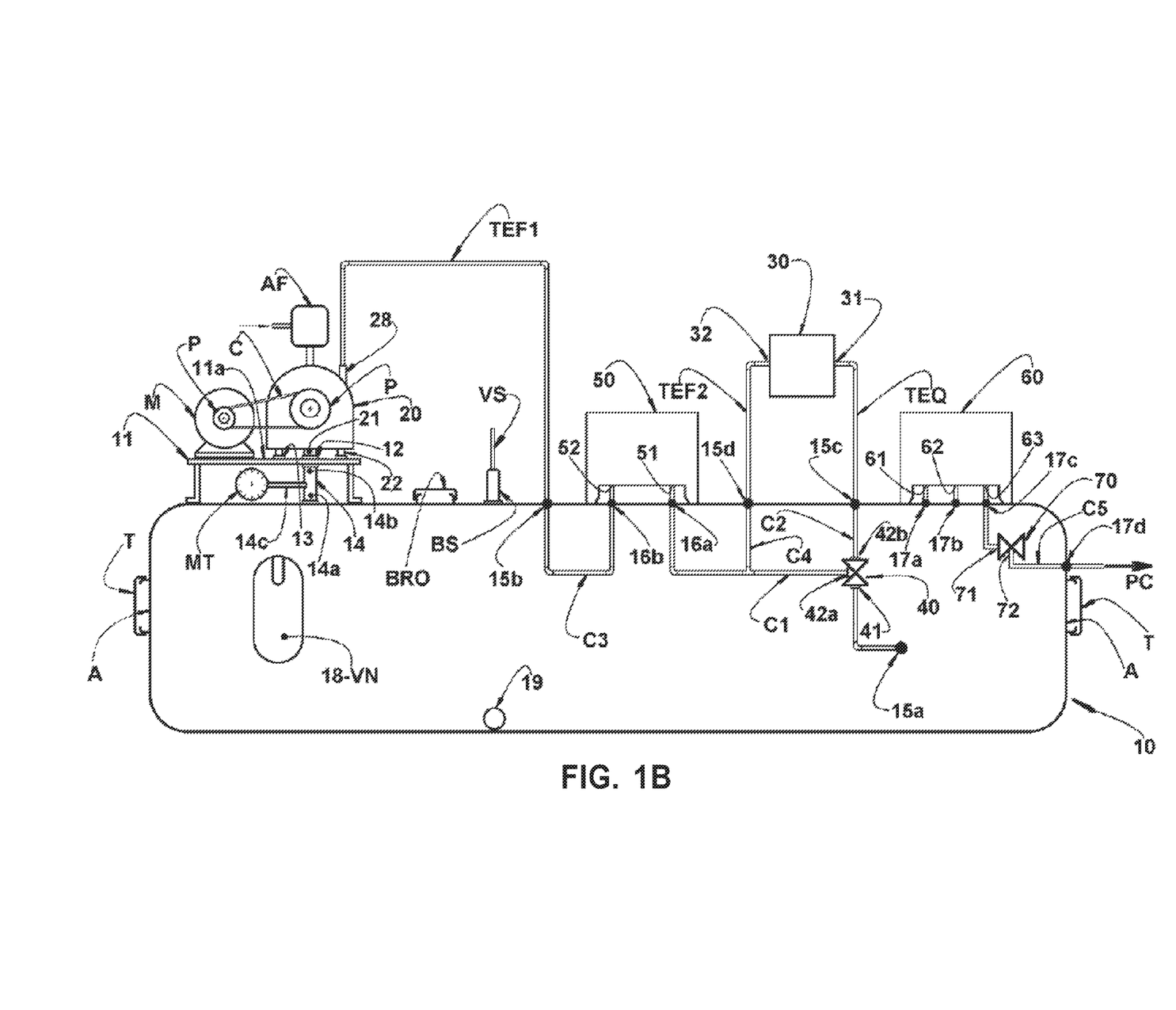
FIG. 1B represents a schematic flowchart, similar to that of FIG. 1A, but illustrating the construction of the air-oil reservoir object of the present invention in which the devices for the treatment and operational control of the air-oil flow are directly connected to the air-oil reservoir.
Figure 2:
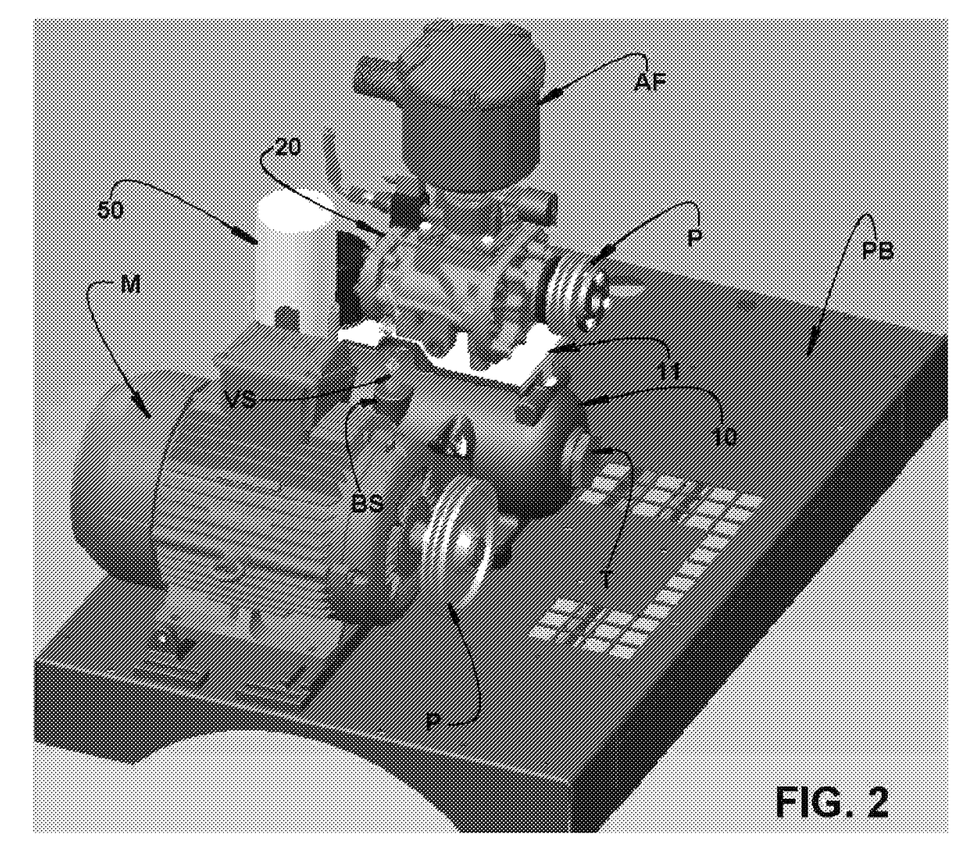
FIG. 2 represents an upper perspective view of a mounting arrangement having an air compressor affixed onto the air-oil reservoir of the present invention, in which said reservoir and the electric motor of the compressor are mounted onto a base plate.
Figure 3:
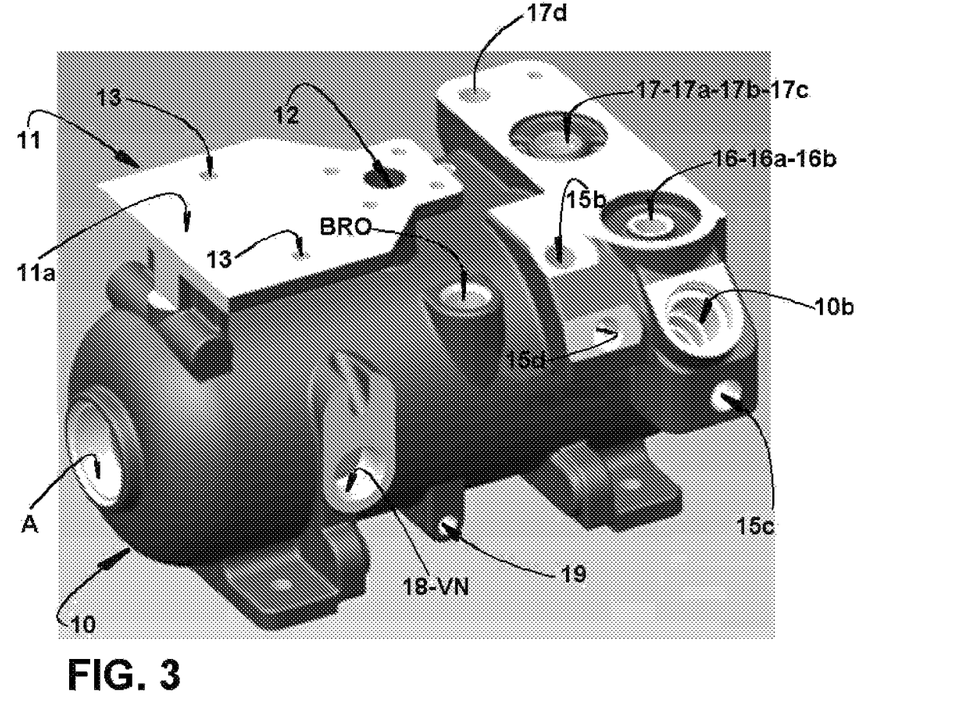
FIG. 3 represents an upper perspective view of the air-oil reservoir, illustrating the support plate for the fixation of the compressor, and also different nozzles for the direct fitting of the devices for controlling and treating the compressed air-oil flow, such as air-oil separating filter, oil filter, minimum pressure valve, thermostatic valve, temperature sensor, relief valve, filling plug, reservoir drain, oil radiator and oil level sight glass.
Figure 4:
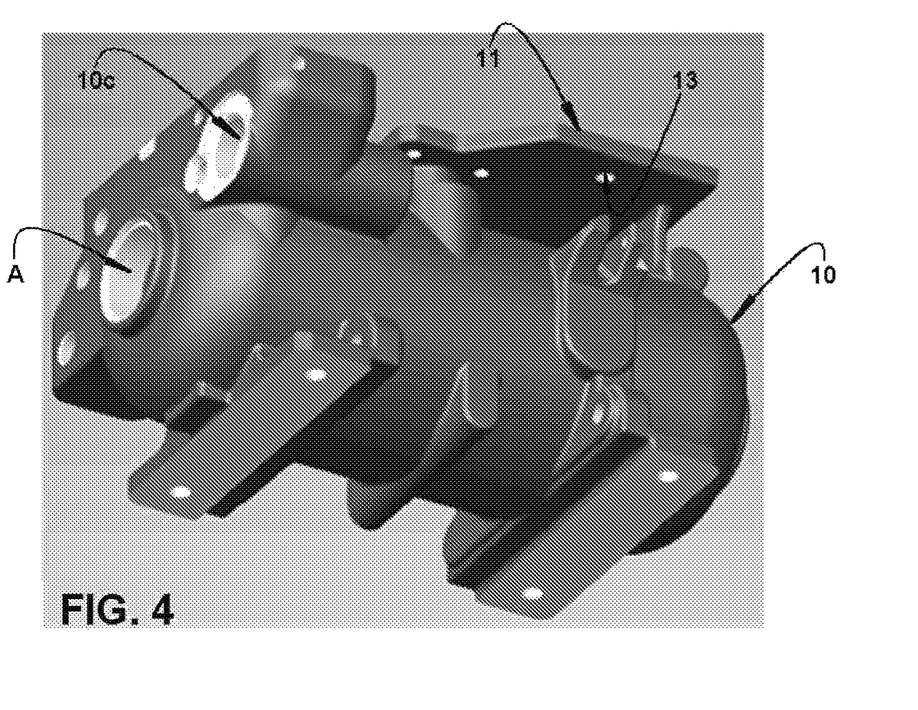
FIG. 4 represents a lower perspective view of the air-oil reservoir, turned 180 degrees in relation to FIG. 3, illustrating part of the support plate for fixation of the compressor, and also an end nozzle, for directly mounting a minimum pressure valve and a manufacture and inspection axial opening.
Figure 5:
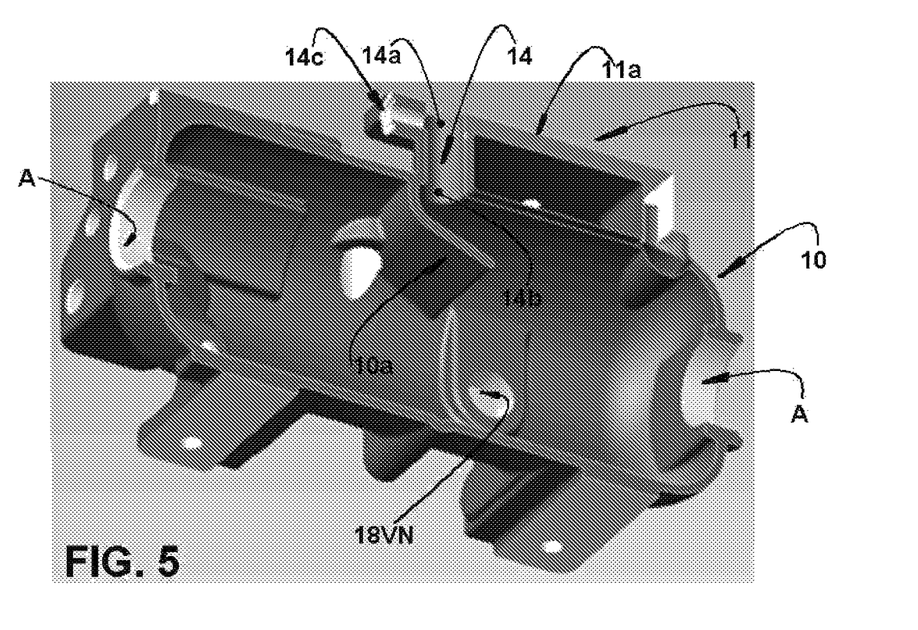
FIG. 5 represents a lower perspective view of the air-oil reservoir, illustrated in FIG. 4, but longitudinally cut, showing part of the support plate, the duct for the entry of the air-oil into the reservoir and the end axial openings for manufacture and inspection.
Figure 6:
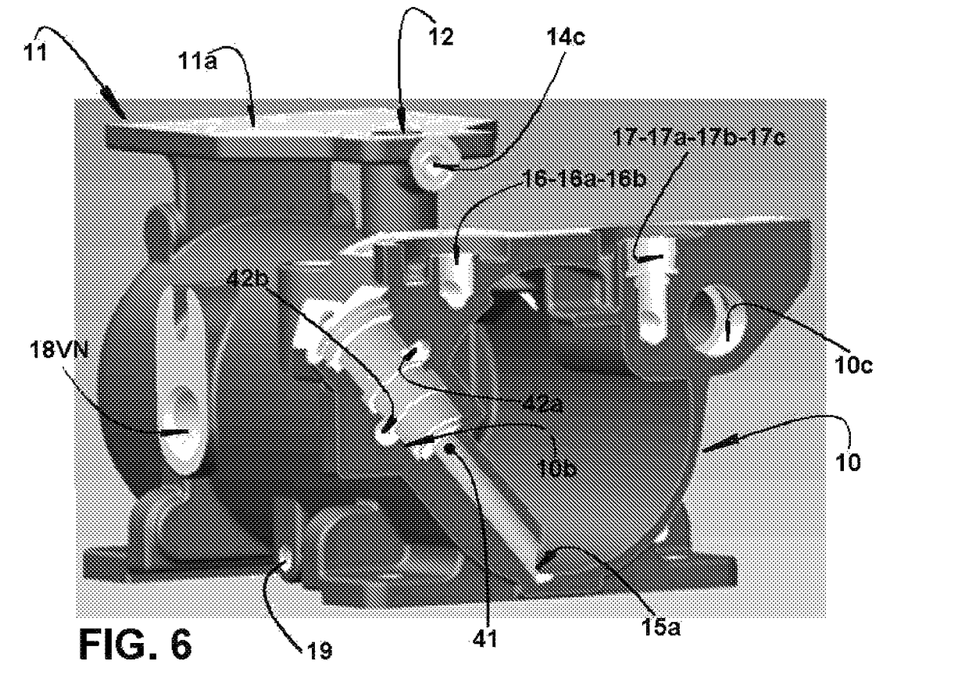
FIG. 6 represents a cross-sectional perspective view of the air-oil reservoir, illustrating the nozzles for the direct mounting of an air-oil separating filter, an oil filter, a thermostatic valve and a minimum pressure valve.
Figure 7:
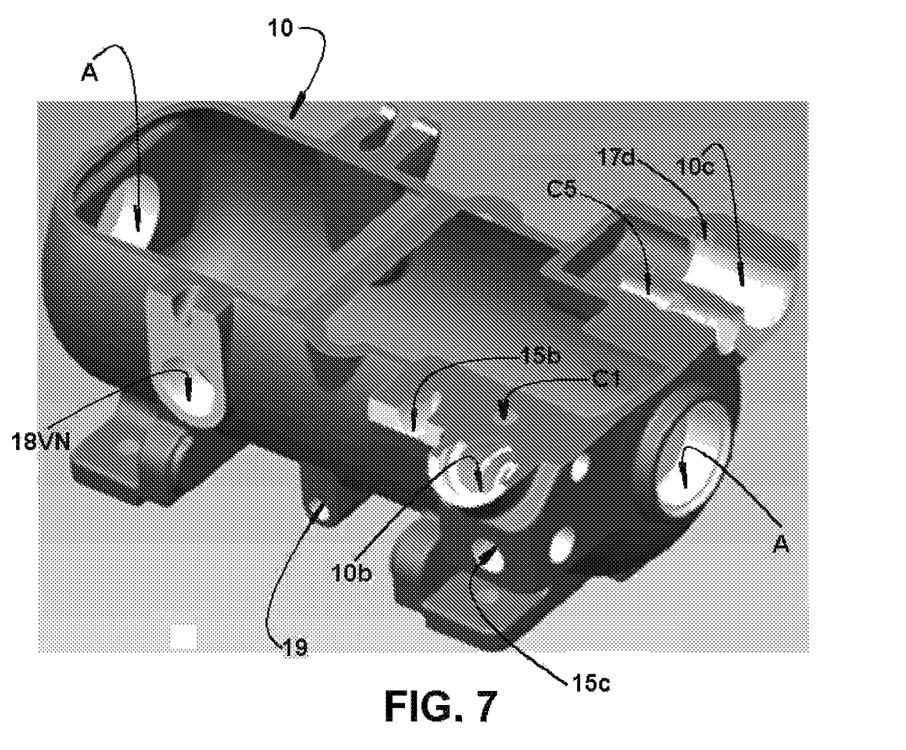
FIG. 7 represents a perspective view of the air-oil reservoir, in a horizontal longitudinal cross section, illustrating the nozzle for the direct mounting of a minimum pressure valve.

The first, the second, and the third internal channel C1, C2, C3 are schematically illustrated in FIG. 1B, the first internal channel C1 being also partially illustrated in FIG. 7.

The cold oil outlet nozzle 15b is directly coupled, by means of a first external tube TEF1, to an oil inlet 28 of the compressor 20, whereas the hot oil outlet nozzle 15c is directly coupled, by means of an external tube TEQ, to the oil inlet 31 of the oil radiator 30, the oil outlet 32 of the latter being connected, also by means of a second external tube TEF2, to an oil return nozzle 15d, connected to a fourth internal channel C4 formed in the body of the air-oil reservoir 10 and open to the first internal channel C1 and, consequently, to the outlet opening 16a of the air-oil reservoir 10, allowing the oil, cooled by the oil radiator 30, to pass through an oil filter 50 directly mounted in the outlet and inlet openings 16a, 16b, before being directed to the compressor 20 through the third internal channel C3, of the cold oil outlet 15b and of the first external tube TEF1.

Thus, when the oil is at a temperature below a certain predetermined value, the thermostatic valve 40 remains with its first outlet 42a open and connected, through the first internal channel C1, of the outlet opening 16a, of the oil filter 50, of the inlet opening 16b, of the third internal channel C3, of the cold oil outlet 15b, and of the first external tube TEF1, to the compressor 20, with the second outlet 42b of the thermostatic valve 40 remaining in the closed condition, impeding the oil to be conducted to the oil radiator 30.

Nevertheless, when the oil is at a temperature superior to a predetermined value, the thermostatic valve 40 has its second outlet 42b gradually open, so as to allow for the release on an oil flow through the oil radiator 30, in order to be cooled and conducted, through the oil return nozzle 15d, of the fourth internal channel C4, of the first internal channel C1, of the outlet opening 16a, of the oil filter 50, of the inlet opening 16b, of the third internal channel C3, of the cold oil outlet nozzle 15b, and of the first external tube TEF1 to the compressor 20.

With the construction described above, the thermostatic valve 40 is directly mounted in the body of the air-oil reservoir 10, allowing for the elimination of any external tubular connection between the thermostatic valve 40 and the air-oil reservoir 10.

According to the appended drawings, the air-oil reservoir 10 is further operatively coupled: to the oil filter 50 having an inlet nozzle 51 and an outlet nozzle 52; to an air-oil separating filter 60, having a mixed flow inlet nozzle 61 and an oil return nozzle 62, open to the interior of the air-oil reservoir 10, and also an air return nozzle 63; and to a minimum pressure valve 70 having an inlet 71 and an outlet 72 and whose function will be described below. In the known constructions, said devices for flow treatment and control are, at least in part, connected to the air-oil reservoir 10 by means of external tubular connections.

According to one more feature of the present invention, the air-oil reservoir 10 has its outlet opening 16a and its inlet opening 16b provided in only one filtering nozzle 16, but which are separated from each other and open to the interior of the air-oil reservoir 10 and in which are directly and respectively coupled the inlet nozzle 51 and the outlet nozzle 52 of the oil filter 50, which is thus directly coupled to the air-oil reservoir 10, without the provision of any external tubular connection.

The air-oil reservoir 10 further comprises a separation nozzle 17 provided with an air-oil outlet opening 17a, with an oil return opening 17b, and with an air return opening 17c, which are separated from each other and in which are directly and respectively coupled the mixed flow inlet nozzle 61, the oil return nozzle 62, and the air return nozzle 63 of the air-oil separating filter 60. The air-oil reservoir 10 is further provided with an end housing 10c, accessible from the exterior of the air-oil reservoir 10 and inside which is mounted the minimum pressure valve 70, having its inlet 71 open to the air return opening 17c of the separation nozzle 17 of the air-oil reservoir 10, and its outlet 72 connected, through a fifth internal channel C5 and through a nozzle 17d of the air-oil reservoir 10, to a point of consumption PC of compressed air.

The mounting arrangement of the air-oil separating filter 60 and of the minimum pressure valve 70 allows, without the provision of any external tubular connection, that the minimum pressure valve 70 is positioned in series with the air return opening 17c of the separation nozzle 17, in order to allow releasing the pressurized air from the air-oil reservoir 10 only when the pressure in the interior of the latter reaches a minimum value after the start of the air compressor 20.

According to the mounting arrangement illustrated in the drawings, the tubular column 14 for the entry of the mixed air-oil flow in the interior of the air-oil reservoir 10, incorporates a lateral derivation 14c (see FIG. 6) in which is adapted a temperature meter MT, the air-oil reservoir 10 being further provided with: a lateral nozzle 18 in which is adapted a level sight glass VN; an oil replacement nozzle BRO; end axial openings A for manufacture and inspection, to be afterwards closed by respective caps T; an upper nozzle BS for fitting a relief valve VS; and an oil drain lower opening 19.

The invention claimed is:

1. An air-oil reservoir for an air compressor to be used in a mounting arrangement of an air compressor of the type inferiorly provided with a discharge nozzle, for air-oil flow, and with seating and anchoring shoes, said air-oil reservoir comprising:

an upper and external support plate, having an upper face and an admission through hole, and also a plurality of fixation holes, the discharge nozzle and the shoes of the air compressor being seated and affixed against the upper face of the support plate, with the discharge nozzle being aligned with the admission through hole and with the shoes being aligned with respective fixation holes, the air-oil reservoir further comprising a tubular column having an inlet end joined to the admission hole and an outlet end open to the interior of the air-oil reservoir which is operatively coupled to an oil radiator having an oil inlet and an oil outlet, to an oil filter having an inlet nozzle and an outlet nozzle, and to an air-oil separating filter having a mixed flow inlet nozzle and an oil return nozzle, which are open to the interior of the air-oil reservoir, and also an air return nozzle and to a minimum pressure valve having an inlet and an outlet, said air-oil reservoir being formed as a single piece further comprising an oil outlet, a cold oil outlet nozzle, a hot oil outlet nozzle, an oil return nozzle, and an inner housing, which is reached through the exterior of the air-oil reservoir and has an end open to the interior of the latter through the oil outlet, in the interior of the inner housing being mounted a thermostatic valve having an inlet, open to the interior of the air-oil reservoir through the oil outlet, and with a first outlet, open to a first internal channel formed in the air-oil reservoir and which leads to a discharge outlet of the latter, and with a second outlet open to a second internal channel, formed in the air-oil reservoir and which leads to a hot oil outlet of the latter, the air-oil reservoir being further provided with end axial openings for manufacture and inspection to be afterwards closed by respective lids and an inlet opening which is connected, through a third internal channel, formed in the air-oil reservoir, to the cold oil outlet nozzle of the latter, the cold oil outlet nozzle and the hot oil outlet nozzle being respectively and directly coupled, by external tubes, to an oil inlet of the compressor and to the oil inlet of the oil radiator, the oil outlet of the latter being connected, by a second external tube, to the oil return nozzle of the air-oil reservoir which has its outlet opening and its inlet opening provided in a single filtering nozzle, but separated from each other and open to the interior of the air-oil reservoir and in which are directly and respectively coupled the inlet nozzle and the outlet nozzle of the oil filter, the air-oil reservoir further comprising a fourth internal channel, formed in the air-oil reservoir and open to the oil return nozzle and to the first internal channel, communicating with the outlet opening of the air-oil reservoir, so that the oil, cooled by the oil radiator, passes through the oil filter, through the inlet opening before being directed to the compressor through the third internal channel, through the cold oil outlet nozzle, and through the first external tube, and also an air return nozzle, provided with a mixed outlet opening, with an oil return opening, and with an air return opening, which are separated from each other and in which are directly and respectively coupled the mixed flow inlet nozzle, the oil return nozzle, and the air return nozzle of the air-oil separating filter, the air-oil reservoir further comprising an end housing, accessible from the exterior of the air-oil reservoir and inside which is mounted the minimum pressure valve, having its inlet open to the air return opening of the air return nozzle of the air-oil reservoir, and its outlet connected, through a fifth internal channel and through a nozzle of the air-oil reservoir, to a compressed air consumption point.

2. The air-oil reservoir, according to claim 1, further comprising an upper nozzle for adaptation of a relief valve and with a lower opening for oil drain.

3. The air-oil reservoir, according to claim 1, characterized in that it is provided with further comprising an oil replacement upper nozzle.

4. The air-oil reservoir, according to claim 3, further comprising an upper nozzle for adaptation of a relief valve and a lower opening for oil drain.

5. The air-oil reservoir, according to claim 1, further comprising a lateral nozzle in which is adapted a level sight glass.

6. The air-oil reservoir, according to claim 5, further comprising an oil replacement upper nozzle.

7. The air-oil reservoir, according to claim 6, further comprising an upper nozzle for adaptation of a relief valve and a lower opening for oil drain.

8. The air-oil reservoir, according to claim 5, further comprising an upper nozzle for adaptation of a relief valve and a lower opening for oil drain.

9. The air-oil reservoir, according to claim 1, wherein the tubular column, for the entry of the mixed air-oil flow into the interior of the air-oil reservoir, includes a lateral derivation in which is adapted a temperature meter.

10. The air-oil reservoir, according to claim 9, further comprising a lateral nozzle in which is adapted a level sight glass.

11. The air-oil reservoir, according to claim 10, further comprising an oil replacement upper nozzle.

12. The air-oil reservoir, according to claim 11, further comprising an upper nozzle for adaptation of a relief valve and a lower opening for oil drain.

13. The air-oil reservoir, according to claim 10, further comprising an upper nozzle for adaptation of a relief valve and a lower opening for oil drain.

14. The air-oil reservoir, according to claim 9, further comprising an oil replacement upper nozzle.

15. The air-oil reservoir, according to claim 14, further comprising an upper nozzle for adaptation of a relief valve and a lower opening for oil drain.

16. The air-oil reservoir, according to claim 9, further comprising an upper nozzle for adaptation of a relief valve and a lower opening for oil drain.

\* \* \* \* \*